US012741908B2

(12) United States Patent
Decker

(10) Patent No.: US 12,741,908 B2
(45) Date of Patent: Sep. 22, 2026

(54) LIGHT WEIGHT CERAMIC AGGREGATES MADE BY AGGLOMERATING CERAMIC FIBERS

(71) Applicant: UNIFRAX I LLC, Tonawanda, NY (US)

(72) Inventor: Jens Decker, Ann Arbor, MI (US)

(73) Assignee: UNIFRAX I LLC, Tonawanda, NY (US)

( * ) Notice: Subject to any disclaimer, the term of this patent is extended or adjusted under 35 U.S.C. 154(b) by 724 days.

(21) Appl. No.: 17/906,628

(22) PCT Filed: Aug. 24, 2022

(86) PCT No.: PCT/US2022/075386

§ 371 (c)(1),
(2) Date: Sep. 19, 2022

(87) PCT Pub. No.: WO2023/028515

PCT Pub. Date: Mar. 2, 2023

(65) Prior Publication Data

US 2023/0312415 A1 Oct. 5, 2023

Related U.S. Application Data

(60) Provisional application No. 63/364,773, filed on May 16, 2022, provisional application No. 63/236,392, filed on Aug. 24, 2021.

(51) Int. Cl.

| | |
|---|---|
| ***B05B 7/00*** | (2006.01) |
| ***C04B 14/42*** | (2006.01) |
| ***C04B 14/46*** | (2006.01) |
| ***C04B 18/02*** | (2006.01) |
| ***C04B 18/24*** | (2006.01) |
| ***C04B 28/06*** | (2006.01) |
| ***C04B 28/34*** | (2006.01) |
| ***C04B 38/10*** | (2006.01) |
| *C04B 111/00* | (2006.01) |
| *C04B 111/28* | (2006.01) |
| *C04B 111/40* | (2006.01) |

(52) U.S. Cl.

CPC .......... *C04B 18/021* (2013.01); *B05B 7/0037* (2013.01); *C04B 14/42* (2013.01); *C04B 14/46* (2013.01); *C04B 18/022* (2013.01); *C04B 18/027* (2013.01); *C04B 18/24* (2013.01); *C04B 28/06* (2013.01); *C04B 28/344* (2013.01); *C04B 38/10* (2013.01); *C04B 18/023* (2013.01); *C04B 2111/00172* (2013.01); *C04B 2111/28* (2013.01); *C04B 2111/40* (2013.01)

(58) Field of Classification Search

CPC ....... C04B 18/021; C04B 14/42; C04B 14/46; C04B 18/022; C04B 18/027; C04B 18/24; C04B 28/06; C04B 28/344; C04B 38/10; C04B 18/023; C04B 2111/00172; C04B 2111/28; C04B 2111/40; C04B 14/48; C04B 20/04; C04B 28/34; B05B 7/0037; B05B 7/0025; B05B 7/149; B05B 7/267; B05B 7/00; B28C 5/026; B28C 5/406; B28C 5/408; F27D 1/16

See application file for complete search history.

(56) References Cited

U.S. PATENT DOCUMENTS

| | | | |
|---|---|---|---|
| 4,012,262 A * | 3/1977 | Patterson | B22D 7/102 428/920 |
| 4,436,680 A * | 3/1984 | Eschner | C04B 28/344 264/641 |
| 4,564,485 A | 1/1986 | Eschner et al. | |
| 5,803,596 A | 9/1998 | Stephens | |
| 5,803,665 A | 9/1998 | Stephens | |
| 6,046,255 A * | 4/2000 | Gray | B01F 25/4524 261/DIG. 26 |
| 2003/0125404 A1* | 7/2003 | Hilton | C04B 28/14 521/50 |

(Continued)

FOREIGN PATENT DOCUMENTS

| | | | |
|---|---|---|---|
| GB | 2060420 A * | 5/1981 | B01F 23/235 |
| GB | 2093015 A * | 8/1982 | C04B 14/04 |

(Continued)

OTHER PUBLICATIONS

Distribution international. Ceramic fiber bulk [retrieved from the internet on Mar. 7, 2025 from <URL:https://www.distributioninternational.com/refractories/ceramic-fiber/ceramic-fiber-bulk>] (Year: 2020).*

Distribution international. Ceramic fiber bulk. wayback <https://web.archive.org/web/20201128173350/https://www.distributioninternational.com/refractories/ceramic-fiber/ceramic-fiber-bulk> (Year: 2020).*

JP-H11147214-A, machine translation (Year: 1999).*

JP-H06191967-A, machine translation (Year: 1994).*

JP-2020083706-A, machine translation (Year: 2020).*

International Search Report and Written Opinion of the International Searching Authority issued by the United States Patent and Trademark Office for International Application No. PCT/US2022/075386 dated Nov. 22, 2022. (22 pages).

First Office Action for Japanese Patent Application No. 2024-511960 issued by the Japanese Patent Office, dated May 13, 2025. (7 pages).

(Continued)

*Primary Examiner* — Marites A Guino-O Uzzle

(74) *Attorney, Agent, or Firm* — Haynes and Boone, LLP

(57) ABSTRACT

A method of agglomerating bulk ceramic fibers includes mixing the bulk ceramic fibers with water to form wet fibers; mixing the wet fibers with a binder including an organic binder and/or an inorganic binder to form agglomerates; and drying the agglomerates. The agglomerates may be mixed with additional binders and fillers to form an insulating mix that may be used to insulate a furnace or other heat source. A foaming nozzle may be used for the application of agglomerates. A foaming agent and water are air atomized within the foaming nozzle and the resulting foam is mixed into pneumatically conveyed agglomerates, which result results in a lightweight refractory material layer on a target substrate.

23 Claims, 5 Drawing Sheets

(56) References Cited

U.S. PATENT DOCUMENTS

| | | | | |
|---|---|---|---|---|
| 2003/0150624 | A1* | 8/2003 | Rummel | B05B 7/0025 169/45 |
| 2004/0061098 | A1 | 4/2004 | Hilton et al. | |
| 2014/0274818 | A1* | 9/2014 | Geary | C04B 35/62635 507/230 |

FOREIGN PATENT DOCUMENTS

| | | | | |
|---|---|---|---|---|
| JP | H021990-081641 | | | 3/1990 |
| JP | H06191967 | A | * | 7/1994 |
| JP | H091997-087046 | A | | 3/1997 |
| JP | H11147214 | A | * | 6/1999 |
| JP | 2012-184127 | A | | 9/2012 |
| JP | 2018-111268 | A | | 7/2018 |
| JP | 2020083706 | A | * | 6/2020 |

OTHER PUBLICATIONS

Extended European Search Report for European Patent Application No. 22862249.4 issued by the European Patent Office, dated Sep. 1, 2025. (17 pages).

Second Office Action for Japanese Patent Application No. 2024-511960 issued by the Japanese Patent Office, dated Dec. 2, 2025. (10 pages).

* cited by examiner

LIGHT WEIGHT CERAMIC AGGREGATES MADE BY AGGLOMERATING CERAMIC FIBERS

CROSS REFERENCE TO RELATED APPLICATIONS

This application is a U.S. National Stage patent application of International Patent Application No. PCT/US2022/075386 filed Aug. 24, 2022, which claims priority to U.S. Provisional Patent Application No. 63/236,392 filed Aug. 24, 2021, and entitled "Light weight ceramic aggregates made by agglomerating ceramic fibers" and U.S. Provisional Patent Application No. 63/364,773 filed May 16, 2022, and entitled "Light weight ceramic aggregates made by agglomerating ceramic fibers." wherein the entireties of each are hereby incorporated by reference.

FIELD OF THE DISCLOSURE

The present disclosure relates to light weight ceramic aggregates made by agglomerating ceramic fibers, a foaming nozzle for the application of light weight refractory concrete by pneumatic gunning, and methods of using the same.

BACKGROUND

Light weight (LW) refractory concrete mixes are used as insulating linings for furnace hot face and back-up linings in industries such as metal production, hydrocarbon processing, cement, power and biomass incineration. A dense refractory furnace lining protects the furnace shell from mechanical wear and from chemical attack at high temperatures in the presence of molten metals, aggressive low melting slags and gaseous compounds. Due to the higher density of refractory hot face linings, in most cases, a second heat insulating layer is required to protect the furnace shell and structure from overheating.

Heat insulating back-up layers are typically ceramic fiber boards, blankets and felts. Insulating fire bricks (IFB) or, for lower temperatures, high porous calcium-silicate or diatomaceous-earth based bricks and boards are also used. The disadvantage of these dry materials is their low mechanical strength and the need to install these materials around anchors which are necessary to hold the later-applied dense hot face in place. Open voids around anchors can easily lead to hot spots compromising anchor welding joints and the integrity of the whole lining system. Consequently, the installation is very time consuming and almost impossible on overhead applications such as furnace roofs.

To allow for more economical installations, insulating concretes can be used. Although the insulating values are not as good as high porosity fibrous materials, the insulating concretes can be cast or sprayed-on with conventional concrete gunning machines, even in overhead positions, and installation times are greatly reduced. Insulating concretes utilize lightweight aggregates such as perlite, vermiculite, diatomaceous earth or expanded clay, and binder components such as Portland cement or calcium aluminate cement ("CAC"). The pre-blended dry components are introduced into a bowl of a gunite machine and are pneumatically conveyed through a hose with an attached spray nozzle. At the spray nozzle, water is added and distributed through a perforated water ring into the dry mix. As a result of the kinetic energy of the material airflow, the resulting wet mix is conveyed onto a target substrate. The level of densification of the material upon impact with the substrate varies depending on the material and air flow rates.

A disadvantage of this conventional method of preparing and applying refractory concretes is the creation of a high amount of dust at the spray nozzle. In order to overcome a high level of dust creation, the process often requires a pre-wetting step prior to placing the material into the machine feed bowl. The high material airflow combined with improper mixing of water and dry material at the spray nozzle often creates high rebound rates and fluctuating densities upon impact on the target substrate. To avoid slump and rebound, the material airflow is often increased, which results in a more densified material substrate layer. As such, further disadvantages include a larger lining thickness compared to fibrous products and longer dry-out times due to the relatively high liquid content trapped behind a dense refractory lining.

LW refractory concretes use raw materials like expanded clay, pre-fired porous shale, slate, perlite, vermiculite or diatomaceous earth aggregates. All these aggregates come from natural occurring raw materials and have the disadvantage of containing variable high quantities of alkali and silica which limits the maximum operating temperatures to less than 1100° C. Respirable crystalline silica components are also of concern because of human exposure during the initial installation and subsequent furnace lining replacements.

To overcome these problems, numerous more defined synthetic refractory LW materials have been developed. These include calcium hexa-aluminate aggregates, crushed and sized IFB with additives and high fired expanded porous mullite based aggregates. However, these aggregates usually possess bulk densities of greater than 35 lb/ft$^3$ (561 kg/m$^3$) and are much costlier than lighter perlite or vermiculite aggregates with bulk densities of less than 25 lb/ft$^3$ (400 kg/m). As a result, these denser aggregates are generally reserved for use in insulating hot face linings operating at temperatures greater than 1100° C. in furnaces where a lower mechanical strength and chemical resistance can be tolerated.

To improve the temperature stability of insulating linings combined with an easier to install ceramic fiber product, Unifrax I LLC developed a fiber spray process using special spray equipment known under the tradename FOAMFRAX®. In this process, components, including, e.g., liquid and solid binders and a foaming compound are blended with bulk fibers in a mixing nozzle and sprayed onto furnace walls as back-up, hot face veneer or full thickness hot face linings. Typically, the mixing nozzle is located several meters before the end of a spray nozzle to allow for proper mixing of the product between the mixing chamber and the spray nozzle. Due to the combination of binders and foam, it was possible to create a very light fiber lining (with a bulk density of less than 25 lb/ft$^3$ (400 kg/m)) without creating airborne fibers at the spray nozzle.

The disadvantages of this installation method are related to the complexity of the spray equipment and the handling of the multiple component binder system on the installation-site. The FOAMFRAX® process uses special blower equipment with a low airflow of approximately 0.4 bar and low material throughput. The mixing nozzle used for the FOAMFRAX® process cannot be used on a conventional concrete gunning machine due to its size, weight, and location. Hence the FOAMFRAX® process only works with ceramic fibers but not with material at higher bulk densities (i.e., greater than 0.25 g/cm$^3$). The requirement of a well-trained crew and specific on-site conditions regarding power supply and equipment maintenance capabilities are also limitations for a greater acceptance in the marketplace. As such, there remains a need for an easy-to-install, light weight insulating lining, and a method and system for installing the same.

SUMMARY

The present disclosure provides a method including mixing bulk ceramic fibers with water to form wet fibers; mixing the wet fibers with a binder comprising an organic binder and/or an inorganic binder to form agglomerates; and drying the agglomerates. The present disclosure also provides a material for refractory light weight concretes or fire-proofing concretes, including: agglomerates produced by mixing bulk ceramic fibers with water to form wet fibers; mixing the wet fibers with a binder comprising an organic binder and/or an inorganic binder to form the agglomerates; and drying the agglomerates; and an additional binder comprising calcium aluminate cement, Portland cement, phosphate salts, colloidal silica, colloidal alumina, liquid aluminum phosphate, phosphoric acid, or combinations thereof. The present disclosure also provides a foaming nozzle for installing lightweight refractory materials, the foaming nozzle comprising: an inlet, wherein the inlet is configured to receive a foaming agent and water admixture; an air valve, wherein the air valve is configured to supply atomizing air to the foaming nozzle; a foaming tube, the foaming tube containing metal wool; and a water distribution body, wherein the water distribution body is configured to be fluidly coupled with a spray nozzle of a gunning machine.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. Embodiments are described in detail hereinafter with reference to the accompanying figures, in which.

DETAILED DESCRIPTION

Figure 1:
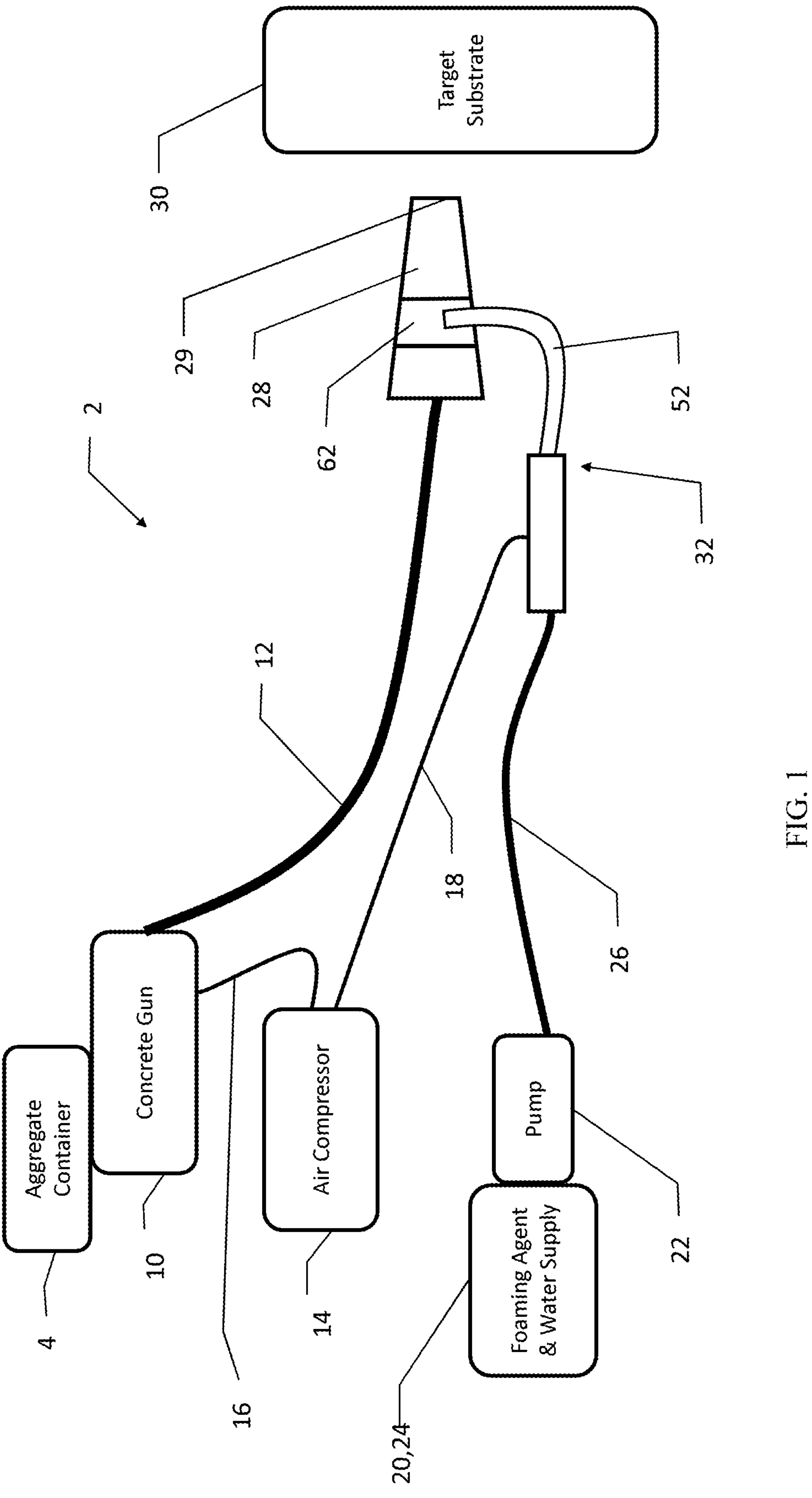
FIG. 1 is diagram of a pneumatic gunning system comprising agglomerated fibers and a foaming nozzle according to one or more embodiments of the present disclosure.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The present disclosure is related to a process of agglomerating bulk ceramic fibers into more easily manageable granules to control particle characteristics for transportation, handling, and performance. The resulting granules are particularly used as insulating light weight aggregates that are blended with additional binders, performance additives and fine particles to allow for: pneumatic conveying and installation by pneumatic gunning with conventional concrete gunning machines; casting and pumping of light weight concrete wet mixes for thermal insulation; dry or semi-dry pressing light weight bricks and shapes; and/or dry bulk insulation mixes. In all the foregoing uses, a dust free, flow-able product is required that does not disintegrate during mechanical mixing, blending, transportation and moisture exposure. That is, a bulk product that will easily flow into cavities of dry gunning machines, pressing tools and building walls is required.

The present disclosure is also related to a foaming nozzle that may be used in conventional pneumatic dry gunning systems and allows for the spraying of a variety of lightweight refractory concrete materials, e.g., the agglomerated bulk ceramic fibers ("agglomerated fibers") and/or material having bulk densities of greater than 0.25 g/cm$^3$. The foaming nozzle may also allow for the installation of lightweight refractory linings with lower densities (i.e., less than 0.8 g/cm$^3$) and associated higher insulating values compared to conventional refractory light weight concretes. In addition, the foaming nozzle facilitates lower rebound rates and lower dust creation, which, among other benefits, improves concrete spraying in confined spaces.

FIG. 1 depicts an embodiment of a concrete gunning system 2. The concrete gunning system 2 includes a dry aggregate container 4, a concrete gun 10, an air compressor 14, a water supply 20, a foaming agent supply 24, a spray nozzle 28, and a foaming nozzle 32. The aggregate container 4 contains agglomerated fibers 8 (shown in FIG. 2) and/or other aggregates and is operably coupled to, or in communication with, the concrete gun 10. The aggregate container 4 supplies the agglomerated fibers 8 and/or other aggregates to the concrete gun 10. The concrete gun 10 is operably connected to the spray nozzle 28 by an aggregate supply hose 12. The air compressor 14 supplies the concrete gun 10 with compressed air through a first air line 16, which allows the concrete gun to move the agglomerated fibers 8 and other aggregates through the aggregate supply hose 12 to the spray nozzle 28.

In one or more embodiments, the aggregate container 4 may contain the agglomerated fibers 8, perlite, vermiculite, expanded clay, diatomaceous earth, or combinations thereof.

In some embodiments, the foaming solution and water admixture is pre-blended in a large container. The pre-blended foaming solution and water admixture is pumped by a pump 22 to the foaming nozzle 32 through a foaming agent and water hose 26. In some embodiments, the pump 22 may be a diaphragm/membrane pump or a centrifugal/impeller pump. An air compressor (e.g., the air compressor 14) is fluidly coupled to the foaming nozzle 32 by a second air line 18.

In some embodiments, the foaming nozzle 32 is operably and fluidly coupled to the spray nozzle 28 via a water distribution body 62 via a foaming tube outlet hose 52. The foaming nozzle 32 turns the foaming agent and water admixture into a fine cellular foam and supplies the foam to the spray nozzle 28 through the water distribution body 62. The foam is mixed in the water distribution body 62 with the agglomerated fibers 8 and/or other aggregates in the spray nozzle 28 before being sprayed out of an outlet 29 of the spray nozzle 28 and onto a target substrate 30. In some embodiments, the water distribution body 62 may be located further upstream along the aggregate supply hose 12 (i.e., further from the spray nozzle 28) to allow a greater distance over which the foam, agglomerated fibers 8, and other aggregates can mix before exiting the outlet 29 of the spray nozzle 28.

Figure 2:
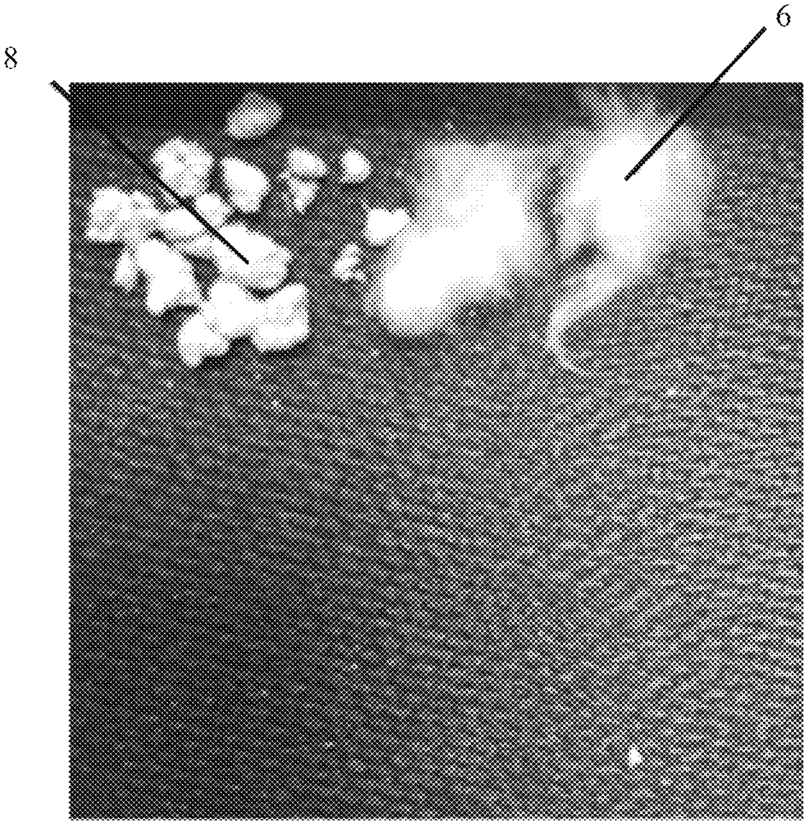
FIG. 2 is a photograph of agglomerated fibers according to an embodiment of the present disclosure compared with non-agglomerated bulk fibers.

FIG. 2 depicts a bulk ceramic fiber 6, before it is agglomerated, and the agglomerated fibers 8 after they have been agglomerated. To convert a ceramic fiber wool (also referred to herein as "ceramic fibers" or "ceramic wool") into granules the following process has been developed. Ceramic fibers that can be used in the present method include, but are not limited to, refractory ceramic (RCF) fibers, low bio-persistent (LBP) fibers, poly crystalline wool (PCW) fibers, glass fibers, alumino zirconia silicate (AZS) fibers, and alkaline earth silicate (AES) fibers. Some examples of ceramic fibers include those that are commercially available from Unifrax I LLC under the marks INSULFRAX® 3010, ISOFRAX®, and FIBERMAX®. The product sold under the INSULFRAX® 3010 mark is a vitreous fiber based on a calcium, magnesium, silicate composition.

In a wetting step, the ceramic wool is mixed with water to form wet fiber. A weight ratio of the wool to water may be, e.g., from 1:1 to 5:1 or from 2:1 to 3:1. In some embodiments, the mixing is performed at low intensity to break down the volume of fiber. Mixers such as vertical shaft paddle mixers or high intensity pan mixers with an intensifier (e.g., an intensive mixer sold by Eirich Machines Inc.) can be used. Other suitable mixers include a horizontal shaft mixer or any type of high intensity mixer that can provide a rolling movement of the bulk material during mixing.

Next, in a binding step, a binder or combination of binders is added to the wet fiber mix. The binder used for the agglomeration process can be polyvinyl alcohol based, carboxy methyl cellulose (CMC), plant-based starches such as potato or rice starch, inorganic binders such as clays (smectite, bentonite, illite, kaolin) and colloidal silica, colloidal alumina or combinations thereof. In some embodiments, the binder may include a calcium aluminate cement, calcium silicate cement, colloidal silica, liquid phosphoric acid, dry phosphate salt, or a combination thereof.

In some embodiments, a cellulose fiber may be added to the wet fiber mix during the agglomeration process. The cellulose fiber content by weight may be about 0.5%, about 1%, about 1.5%, about 2%, about 2.5%, about 3%, from 0.5 to 3%, from 1 to 2.5%, or from 1.5 to 2%, based on a total weight of the wet mixture or based on a total weight of the agglomerates. The addition of the cellulose fibers supports decreased bulk densities of the agglomerates below 20 lb/ft$^3$, and further supports decreased sprayed densities below 25 lb/ft$^3$. In some embodiments, the slump resistance of the sprayed agglomerate fibers containing the cellulose fibers may be reduced when spraying overhead or at an angle of greater than 45 degrees, 50 degrees, 60 degrees, 70 degrees, 80 degrees, from 45 to 90 degrees, from 50 to 80 degrees, or from 60 to 70 degrees relative to the ground (i.e., horizontal).

In some embodiments, the binding step may be combined with the wetting step such that the water and the binder are added together to the ceramic wool. In other embodiments, the binding step may precede the wetting step such that the binder is added to the dry ceramic wool. In any embodiment, the binder is distributed with the fibers in the binding step by mixing. This mixing may be performed at medium intensity and may use the same mixers mentioned above. In some embodiments, the mixing intensity used in the binding step is greater than the mixing intensity used in the wetting step.

After the wetting and binding steps, the mixture of water, ceramic wool, and binder includes agglomerates. These agglomerates may be broken up into smaller agglomerates by additional mixing. For example, larger agglomerates may be broken up at a high mixing intensity that is higher than the mixing intensity used in the wetting and binding steps.

In some embodiments, larger agglomerates than those formed by the wetting and binding steps may be desired. In such cases, additional water may be added to the agglomerates to obtain the desired average particle size. If too much water is added, the agglomerates can break down into a pliable cake. In some embodiments, the moisture content of the agglomerates is controlled to be less than 51%, less than 49%, less than 47%, less than 45%, less than 30%, from 10 to 55%, from 20 to 55%, from 35 to 55%, from 39 to 52%, from 40 to 50%, or about 45%.

In some embodiments, spherical shaped granules may be formed by transferring the fiber agglomerates into a disk pelletizer. Any other appropriate shaping or sizing operations may be performed on the agglomerates before or after they are dried.

In some embodiments, all of the agglomerates have a particle size of less than 20 mm, less than 15 mm, less than 12 mm, less than 10 mm, or less than 6 mm. In some embodiments, at least 95 wt % of the agglomerates have a particle size of less than 20 mm, less than 15 mm, less than 12 mm, less than 10 mm, or less than 6 mm. In some embodiments, the agglomerates have a median particle size of 1 to 5 mm, 2 to 4 mm, or about 3 mm. In some embodiments, the agglomerates do not include any particles having a size of less than 0.5 mm, less than 0.3 mm, less than 0.1 mm, or less than 0.01 mm. In an embodiment, no dust is left in a screening pan after screening the agglomerates in a 0.06 mm sieve, that is, substantially all of the ceramic wool is incorporated into the agglomerates.

In a drying step, the agglomerates are transferred into a dryer. In some embodiments, the drying may be performed at temperatures of from 80° C. to 110° C. Optionally, the drying step may comprise firing the agglomerates at temperatures of from 110° C. to 1300° C.; this may be in lieu of or in addition to drying at temperatures of from 80° C. to 110° C.

The agglomerated fibers made by the process of the present disclosure can be used in a wide variety of applications and can replace inconsistent natural raw material-based light weight aggregates in conventional concretes, coatings and fire proofing materials. For example, it is possible to use the agglomerated fibers in thermal insulating concrete wet mixes by applying a hydrophobic additive or surfactant such as a silicone emulsion at the end of the agglomeration process.

In some embodiments, the agglomerated fibers may be combined with an additional binder to form a raw material for refractory light weight concretes or fire proofing concretes. In some embodiments, the additional binder comprises calcium aluminate cement, Portland cement, phosphate salts, colloidal silica, colloidal alumina, liquid aluminum phosphate, phosphoric acid, or combinations thereof.

In some embodiments, the agglomerated fibers may also include a mineral-based filler. In some embodiments, the mineral-based filler comprises andalusite, mullite, alumina-silicates, micro silica, calcined alumina, reactive alumina, tabular alumina, or combinations thereof. Ratios of the agglomerates, additional binder, and mineral-based filler can be tailored to provide a desired density, strength, and thermal conductivity.

In some embodiments, the agglomerated fibers can be incorporated into raw materials that can be applied by casting, ramming, hand packing, pumping, shot-crete and/or pneumatic gunning with conventional gunning machines. In other embodiments, the agglomerated fibers can be formed into a pressed shape by axial pressing, isostatic pressing, semi-isostatic pressing and/or extrusion. In yet additional embodiments, the agglomerated fibers can be incorporated into a dust free bulk insulating mix that can be blown or poured into cavities of building.

Figure 3:
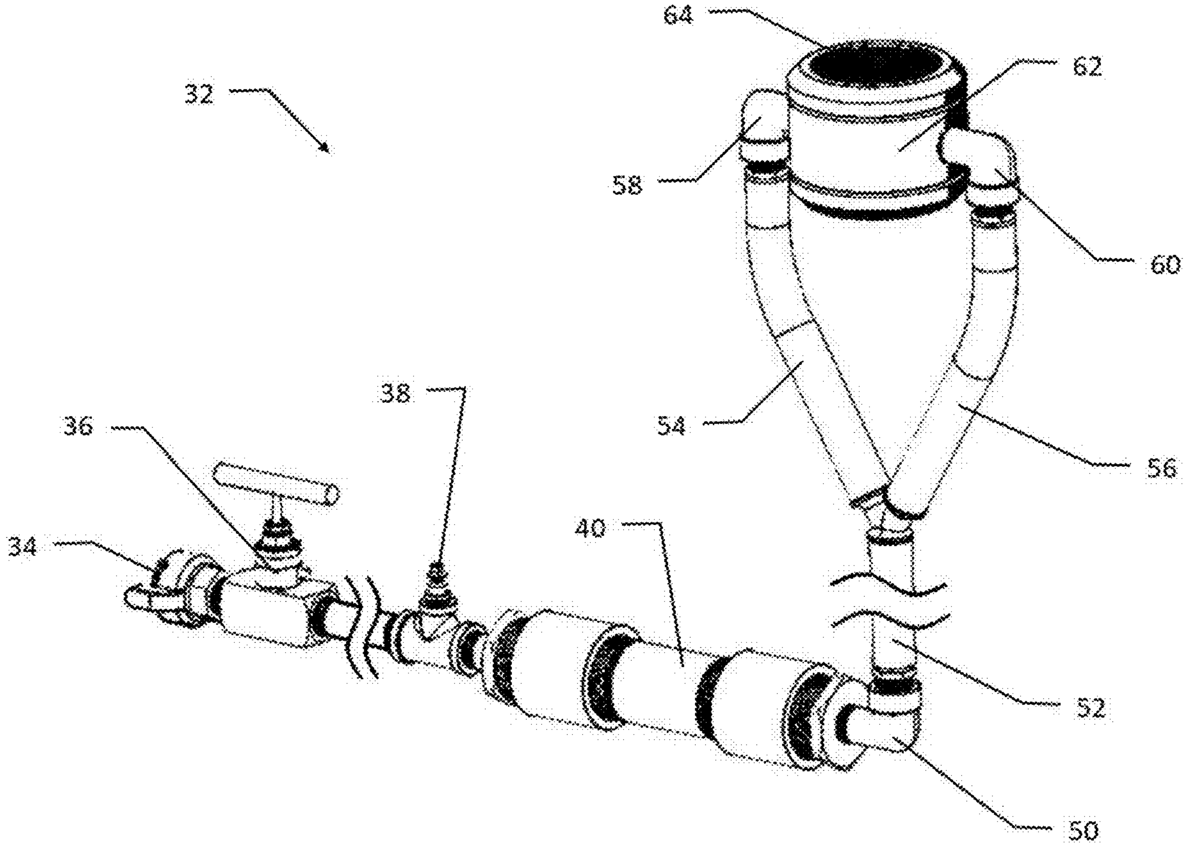
FIG. 3 is a perspective view of a foaming nozzle according to an embodiment of the present disclosure.
Figure 4:
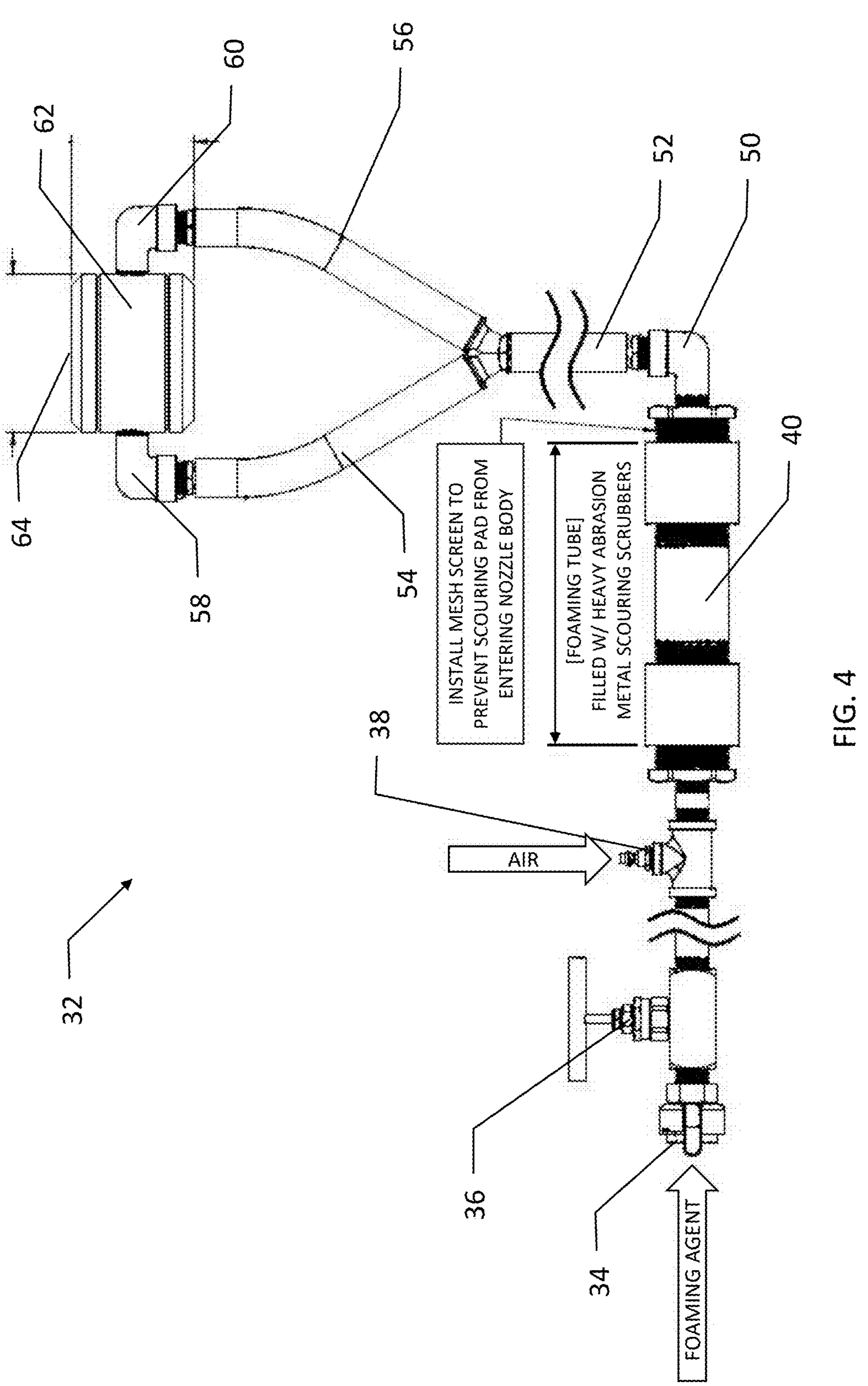
FIG. 4 is a schematic side view of a foaming nozzle according to an embodiment of the present disclosure.

In FIGS. 3 and 4, an embodiment of the foaming nozzle 32 is shown. The foaming nozzle 32 comprises a foaming agent and water admixture inlet 34, a foaming tube 40, the water distribution body 62, and an outlet(s) 64. In some embodiments, the foaming nozzle 32 further comprises a water shutoff valve 36. In some embodiments, the foaming nozzle 32 further comprises an air valve 38. It is to be understood that these elements can be assembled in a variety of arrangements in various embodiments.

In some embodiments, the water shutoff valve 36 is fluidly coupled to the admixture inlet 34, and the air valve 38 is fluidly coupled to the water shutoff valve 36. In some embodiments, an additional flexible hose may be located between the water shutoff valve 36 and the air valve 38. This additional flexible hose fluidly couples the water shutoff valve 36 and the air valve 38 and may be of any length suitable to the application. The additional flexible hose may be between 1 and 12 inches in length, or between 1 and 6 feet in length.

The air valve 38 is fluidly coupled to the foaming tube 40, and the foaming tube 40 is fluidly coupled to the water distribution body 62 by a foaming tube outlet hose 52. In some embodiments, the foaming tube outlet hose 52 is a flexible hose and may be of any length suitable to the application. The foaming tube outlet hose 52 may be between 1 and 12 inches in length, or between 1 and 6 feet in length. In some embodiments, and referring again to FIG. 1, the water distribution body 62 is fluidly coupled to the spray nozzle 28 before the outlet 29 of the spray nozzle 28. In other embodiments, the water distribution body 62 may be connected along, and fluidly coupled to, the aggregate supply hose 12.

In operation, and with continuing reference to FIGS. 1, 3 and 4, the pump 22 pumps the foaming agent and water admixture from the foaming agent and water supplies 20, 24 to the admixture inlet 34 of the foaming nozzle 32 via the foaming agent and water hose 26. In some embodiments, the foaming agent may include a surfactant such as polyvinyl alcohol, ammonium lauryl sulfate or other sulfonates, or any protein based foaming additive. In some embodiments, the foaming agent may be a polyvinyl foaming solution containing polyvinyl alcohol. The polyvinyl foaming solution concentration (by weight) may be 0.1%, 0.5%, 1%, 2%, 3%, 4%, 5%, 6%, 7%, 8%, 9%, 10%, between 0.5% and 10%, between 2% and 5%, between 2% and 6%, between 0.2% and 2%, between 0.9% and 1.5%, less than 10%, or greater than 1%. The foaming admixture passes through the water shutoff valve 36 and the air valve 38 and enters the foaming tube 40. The air valve 38 supplies atomizing air to the foaming nozzle 32 which helps facilitate foaming of the foaming agent and water admixture within the foaming tube 40. In some embodiments, the air valve may supply air at a pressure of 1 bar, 1.1 bar, 1.2 bar, 1.3 bar, 1.4 bar, 1.5 bar, 1.6 bar, 1.7 bar, 1.8 bar, 1.9 bar, 2.0 bar, between 0.5 and 2 bar, or between 1 and 1.5 bar.

The foaming tube 40 has a body defining an interior and a first and second end. The foaming tube 40 is configured to allow the foaming agent and water admixture to pass through the interior. In some embodiments, the foaming tube 40 is of a cylindrical shape. In some embodiments, the foaming tube may have a length to diameter ratio of 4:1, or between 2:1 and 6:1. In other embodiments, the foaming tube 40 may be a rectangular prism, hexagonal prism, octagonal prism, or any other shapes desired for a particular application.

The interior of the foaming tube 40 contains an abrasive, high-surface area material. In some embodiments, the high-surface area material contained within the interior of the foaming tube 40 is a metal wool. In some embodiments, the metal wool may be made of steel or stainless steel. It is contemplated that the metal wool may be an organic or inorganic steel wool. In other embodiments, the abrasive, high-surface area material may be a polymer material. A polymer material advantageously assists in avoiding corrosion.

The metal wool, or other abrasive, high-surface area material, has a large surface area which agitates the foaming agent and water admixture as it passes through the foaming tube 40. The combination of the atomizing air supplied by the air compressor 14 via the air valve 38 and the large surface area of the metal wool causes the foaming agent and water admixture to become a fine cellular foam. The fluid pressure of the foaming agent and water admixture supplied to the foaming tube 40 is greater than the air pressure supplied by the air valve 38, in order to avoid backpressure.

The fine cellular foam exits the foaming tube 40 and flows to the water distribution body 62 through the foaming tube outlet hose 52. The foaming tube 40 is fluidly coupled to the foaming tube outlet hose 52 by a foaming tube outlet connection 50. In some embodiments, the foaming tube outlet connection 50 is a 90° elbow connection that turns the flow of foam 90° after leaving the foaming tube 40. In other embodiments, the foaming tube outlet connection 50 has an angle between 0° and 120°.

In some embodiments, the foaming tube outlet hose 52 may carry the flow of foam directly to the water distribution body 62. In other embodiments, the foaming tube outlet hose 52 may split into a plurality of foam hoses (i.e., at least one) that carry the foam to the water distribution body 62. In the embodiment shown in FIGS. 3 and 4, the foaming tube outlet hose 52 splits into a first foam hose 54 and a second foam hose 56. The foaming tube outlet hose 52 is fluidly coupled to the first and second foam hoses 54, 56 by a Y-type connection. Splitting the flow of foam from the foaming tube outlet hose 52 into a plurality of foam hoses can result in a better distribution of foam at the outlet(s) 64 of the water distribution body 62.

The first and second foam hoses 54, 56 are fluidly coupled to the water distribution body 62 by a first and second body connection 58, 60. In the embodiment shown in FIGS. 3 and 4, the first and second body connections 58, 60 are fluidly coupled to the water distribution body 62 at a 90° angle. In other embodiments, the first and second body connections 58, 60 may connect to the water distribution body 62 at an angle be between 0° and 120°.

The water distribution body 62 is fluidly coupled to the spray nozzle 28. The water distribution body 62 has a cylindrical tube shape with a side wall that is radially spaced from a central axis and circumferentially inscribes an interior portion. The water distribution body 62 is fluidly coupled to the spray nozzle 28 such that the central axis of the water distribution body 62 and a central axis of the spray nozzle 28 are axially aligned. In other embodiments, the water distribution body 62 is fluidly coupled to the aggregate supply hose 12 further upstream from the spray nozzle 28. The water distribution body 62 is axially aligned with a central axis of the aggregate supply hose 12 in those embodiments. In either configuration, the water distribution body 62 is in fluid communication with the aggregate supply hose 12 and the spray nozzle 28.

At the water distribution body 62, the flow of foam enters the interior portion of the water distribution body 62 through the outlet(s) 64. The number of outlet(s) 64 in the water distribution body 62 is equal to the number of foam hoses 54, 56. In some embodiments, the number of outlet(s) 64 may be greater than the number of foam hoses 54, 56. Because the water distribution body 62 is in fluid communication with the aggregate supply hose 12 and the spray nozzle 28, the material flow of agglomerated fibers 8 and other aggregates passes through the water distribution body 62.

In the water distribution body 62 and continuing through the spray nozzle 28 to the spray nozzle outlet 29, the material flow of agglomerated fibers 8 and other aggregates is mixed with the foam. The high volume of foam traps almost all dust particles created by the material flow. This may greatly improve application processes performed in closed and confined spaces. The foam also reduces the kinetic energy of the material flow. As a result, the refractory lining deposited on the target substrate 30 has a high porous structure with a greatly reduced density as compared to refractory linings produced by conventional gunning processes. The light, sticky, and highly porous structure of the foam and material flow mix also results in very low rebound and slump rates and greatly improved insulation, as compared to conventional gunning processes.

The flow of the foaming agent and water admixture entering this system may be controlled by the water shutoff valve 36. The flow can be adjusted depending on the application, user preference, and the like. Depending on the substrate, the direction of spray, the environment surrounding the substrate, and other similar factors, an adjusted moisture content or volume of foam may be desired. In any application of the system, the material flow rate through the aggregate supply hose 12 is greater than the flow rate of foam into water distribution body 62, and the pressure of the foaming agent and water admixture entering the foaming nozzle 32 is greater than the air pressure entering the air valve 38, in order to avoid backflow/backpressure in the system.

The characteristics of this refractory concrete allow it to fill tighter spaces and fill in around anchors more effectively and efficiently. It further allows for overhead spraying without the need for additional anchoring as compared to conventional gunning processes. Additionally, because the foam more effectively adds moisture to the material flow and more effectively traps dust particles, the concrete gunning system 2 requires less water than conventional gunning processes.

Figure 5:
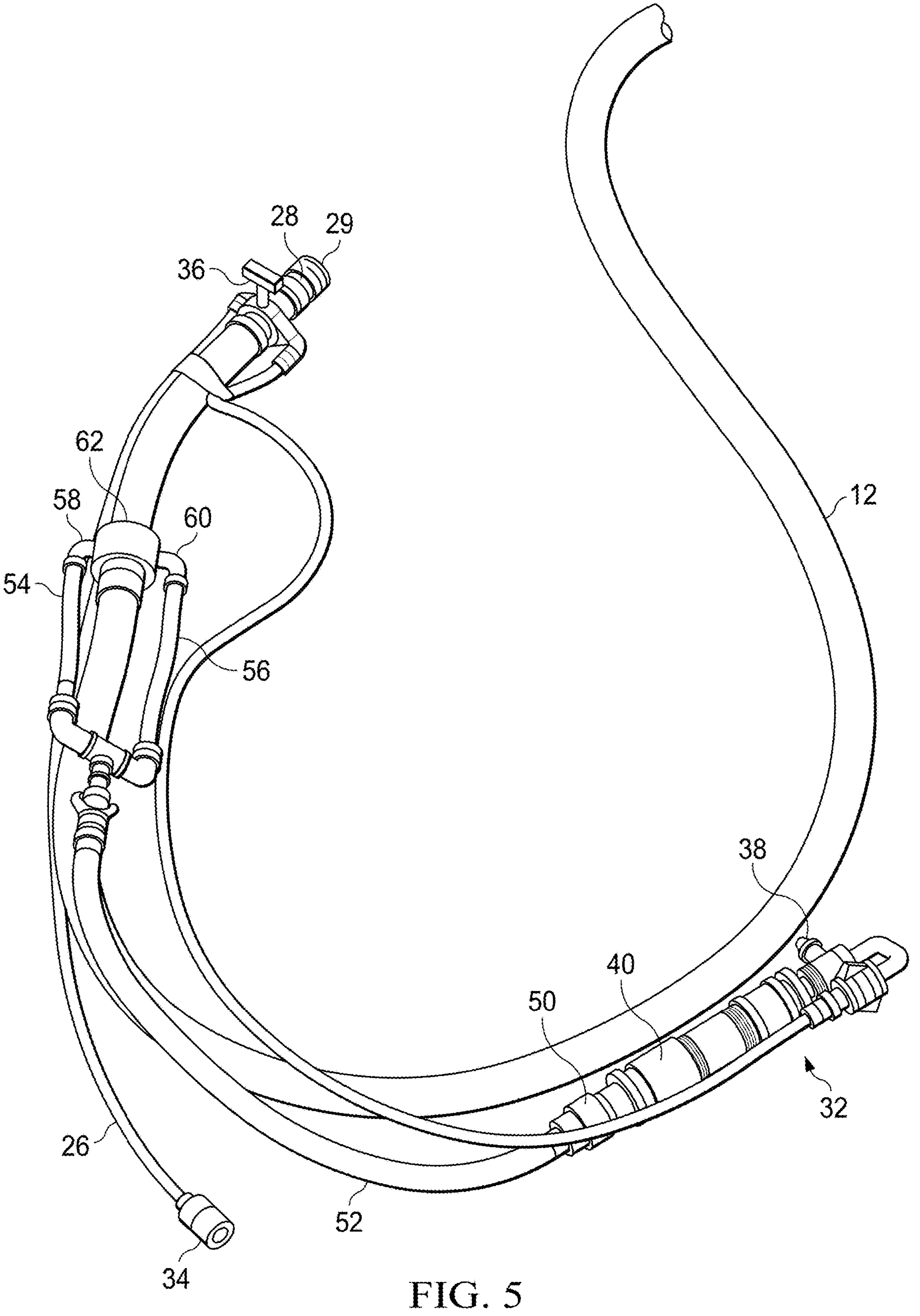
FIG. 5 is a photograph of a foaming nozzle and portions of a concrete gunning system according to an embodiment of the present disclosure.

In FIG. 5, an embodiment of the foaming nozzle 32 and portions of the concrete gunning system 2, specifically the spray nozzle 28 and the aggregate supply hose 12, are shown. In this embodiment, the water shutoff valve 36 is fluidly coupled at either end to additional flexible hosing between the admixture inlet 34 and the air valve 38. The additional flexible hosing allows the water shutoff valve 36 to be mounted to the spray nozzle 28, or in other embodiments to the aggregate supply hose 12 near the spray nozzle 28. Such placement of the water shutoff valve 36 provides a user of the system with more ergonomic access and control of the valve.

The additional flexible hosing coming from the water shutoff valve 36 is fluidly coupled to the air valve 38. The air valve 38 is fluidly coupled to the foaming tube 40. The foaming tube 40 is fluidly coupled to the foaming tube outlet connection 50, which is fluidly coupled to the foaming tube outlet hose 52. The foaming tube outlet hose 52 splits at a Y-type joint into the first foam hose 54 and the second foam hose 56. The first and second foam hoses 54, 56 are fluidly coupled to the water distribution body 62 via first and second body connections 58, 60. The water distribution body 62 is fluidly coupled within the aggregate supply hose 12 near the spray nozzle 28.

EXAMPLES

Example 1

Agglomerates were formed by mixing the components shown in Table 1 below. In particular, ceramic wool (INSULFRAX® 3010) was mixed with a first portion of water to form wet fibers. Smectite clay and CMC binders were then added to the wet fibers and mixed. A second portion of water was added and mixed into the agglomerates. The agglomerates were then dried.

TABLE 1

| Component | (g) | wt % |
|---|---|---|
| Water | 700 | 42 |
| Smectite Clay | 40 | 2.5 |
| CMC | 20 | 1.5 |
| INSULFRAX ® 3010 Bulk | 900 | 54 |

FIG. 2 shows the bulk ceramic fiber 6 (right) next to the agglomerated fibers 8 (left).

Example 2

The agglomerated fibers of Example 1 were blended with 15% calcium aluminate cement resulting in a 520 kg/m$^3$ bulk density. This dry mixture was placed into the bowl of a conventional Piccola type concrete gunning machine equipped with a shallow pocket wheel. A 3% by weight polyvinyl alcohol foaming solution was added and pre-blended with water. The foaming solution and water was supplied to a foaming nozzle according to FIGS. 3 and 4. The foaming nozzle was attached to the spray nozzle of the gunning machine.

The material airflow pressure of the aggregates was 1.3 bar and the foaming nozzle atomizing air pressure was 1.4 bar. The liquid foaming admixture was pumped with a membrane pump into the metal wool filled foaming tube at a pressure of 6.8 bar. The material flow from the gunning machine towards the spray nozzle was 0.8 m$^3$/hr. The resulting refractory lining “placed density” on the target substrate was 720 kg/m$^3$ and the “fired density” was around 500 kg/m$^3$. The rebound was less than 6% and with no significant dust emissions at the spray nozzle during installation.

Example 3

The agglomerated fibers of Example 1 were blended with a magnesium phosphate cement comprising 12% magnesium phosphate hydrate and 5% magnesium oxide, resulting in a 500 kg/m$^3$ bulk density. This dry mixture was placed into the bowl of a conventional Piccola type concrete gunning machine equipped with a shallow pocket wheel. A 5% by weight polyvinyl alcohol foaming solution was added and pre-blended with water. The foaming solution and water was supplied to a foaming nozzle according to FIGS. 3 and 4. The foaming nozzle was attached to the spray nozzle of the gunning machine.

The material airflow pressure of the aggregates was 1.6 bar and the foaming nozzle atomizing air pressure was 1.4 bar. The liquid foaming admixture was pumped with a membrane pump into the metal wool filled foaming tube at a pressure of 6.8 bar. The material flow from the concrete gun towards the spray nozzle was 0.8 m$^3$/hr. The resulting refractory lining "placed density" on the target substrate was 720 kg/m$^3$ and the "fired density" was around 480 kg/m$^3$. The rebound was less than 6% and with no significant dust emissions at the spray nozzle during installation.

Although various embodiments have been shown and described, the disclosure is not limited to such embodiments and will be understood to include all modifications and variations as would be apparent to one of ordinary skill in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

What is claimed is:

1. A method, comprising:
- mixing bulk ceramic fibers with a binder comprising an organic binder and/or an inorganic binder to form agglomerates;
- supplying the agglomerates to a spray nozzle via a first supply hose;
- supplying a foam to the spray nozzle via a second supply hose that is different from the first supply hose;
- mixing the foam with the agglomerates within the spray nozzle to form a foam and agglomerates mixture; and
- using the spray nozzle, spraying the foam and agglomerates mixture onto an object.

2. The method of claim 1, further comprising sizing the agglomerates by transferring the agglomerates into a disk pelletizer to create spherical shaped granules.

3. The method of claim 1, wherein the bulk ceramic fibers comprise refractory ceramic fibers, low bio-persistent fibers, polycrystalline ceramic fibers, and/or glass fibers; and
- wherein the agglomerates comprise 0.5 to 3 wt % of cellulose fibers, based on a total weight of the agglomerates.

4. The method of claim 1, wherein the binder comprises polyvinyl alcohol, carboxy methyl cellulose, plant-based starches, surfactants, colloidal silica, colloidal alumina, or combinations thereof.

5. The method of claim 1, wherein the mixing the bulk ceramic fibers utilizes a horizontal shaft mixer or a vertical shaft mixer.

6. The method of claim 1, wherein the agglomerates have particle sizes of less than 15 mm;
- wherein the agglomerates have a median particle size of 1 to 5 mm, 2 to 4 mm, or about 3 mm; and
- wherein the agglomerates do not include any particles having a size of less than 0.1 mm.

7. The method of claim 1, further comprising applying the agglomerates to an object by casting, ramming, hand packing, pumping, and/or pneumatic gunning.

8. The method of claim 1, further comprising forming a pressed shaped by axial pressing, isostatic pressing, semi-isostatic pressing and/or extrusion of the agglomerates.

9. The method of claim 1, further comprising:
- mixing a foaming agent and water to form a foaming mixture;
- foaming the foaming mixture in a foaming nozzle fluidically coupled to the spray nozzle and the second supply hose to form the foam; and
- supplying the foam to the spray nozzle via the foaming nozzle.

10. The method of claim 9, wherein the foaming nozzle comprises a foaming tube that facilitates foaming of the foaming mixture.

11. The method of claim 10, wherein the foaming tube contains a metal wool.

12. The method of claim 11, further comprising:
- supplying atomizing air to the foaming tube to facilitate the foaming of the foaming mixture at pressure between 0.5 and 2 bar.

13. The method of claim 12, wherein supplying the foam to the spray nozzle via the foaming nozzle further comprises:
- supplying, via a foam outlet hose of the foaming nozzle that is different from the first supply hose, the foam from the foaming tube to a water distribution body fluidically coupled to the spray nozzle; and
- supplying the foam from the foaming nozzle to the spray nozzle via the water distribution body.

14. The method of claim 13, further comprising:
- splitting the supply of foam from the foam outlet hose to the water distribution body into first and second foam hoses to facilitate distribution of the foam to the spray nozzle via the water distribution body.

15. The method of claim 9, wherein the foaming agent comprises polyvinyl alcohol, ammonium lauryl sulfate, or a protein based foaming additive.

16. The method of claim 9, further comprising:
- supplying aggregates, comprising perlite, vermiculite, expanded clay, diatomaceous earth, or combinations thereof, with the agglomerates to the spray nozzle via the first supply hose.

17. The method of claim 1, further comprising:
- adjusting, using a valve fluidically coupled with the second supply hose, a flow of the foam supplied to the spray nozzle.

18. The method of claim 1,
- wherein the agglomerates are supplied to the spray nozzle via the first supply hose at a first flow rate; and
- wherein the foam is supplied to the spray nozzle via the second supply hose at a second flow rate that is less than the first flow rate.

19. The method of claim 1, wherein mixing the bulk ceramic fibers with the binder further comprises:
- mixing the bulk ceramic fibers with water to form wet fibers.

20. The method of claim 19,
- wherein the ceramic fibers are mixed with water at a first mixing intensity;
- wherein the wet fibers are mixed with the binder at a second mixing intensity that is greater than the first mixing intensity; and
- wherein the method further comprises sizing the agglomerates via additional mixing at a third mixing intensity that is greater than the second mixing intensity.

21. The method of claim 19, wherein the steps of mixing the bulk ceramic fibers with water and mixing the bulk ceramic fibers with the binder are combined such that the water and the binder are added to the bulk ceramic fibers together.

22. The method of claim 1, wherein the agglomerates have a bulk density of greater than 0.25 $g/cm^3$.

23. A method for installing a foam and agglomerates mixture, comprising:

mixing bulk ceramic fibers with a binder comprising an organic binder and/or an inorganic binder to form agglomerates;

supplying the agglomerates to a spray nozzle via a first supply hose;

mixing a foaming agent and water to form a foaming mixture;

supplying the foaming mixture to a foaming nozzle via a second supply hose that is different from the first supply hose;

supplying atomizing air to the foaming nozzle at a pressure between 0.5 and 2 bar;

foaming the foaming mixture in a foaming tube of the foaming nozzle to create a foam, wherein the supply of atomizing air facilitates the foaming of the foaming mixture, and wherein the foaming tube contains a metal wool that facilitates the foaming of the foaming mixture;

supplying the foam from the foaming nozzle to the spray nozzle via a foam outlet hose of the foaming nozzle that is different from the first supply hose;

splitting the supply of foam from the foam outlet hose to the spray nozzle into first and second foam hoses to facilitate distribution of the foam to the spray nozzle;

mixing the foam with the agglomerates within the spray nozzle to form a foam and agglomerates mixture; and using the spray nozzle, spraying the foam and agglomerates mixture onto an object.

* * * * *